United States Patent [19]

Crook et al.

[11] Patent Number: 5,895,683
[45] Date of Patent: Apr. 20, 1999

[54] EXTRUSION OF FAT-BASED CONFECTIONERY WITH USE OF VACUUM PRESSURE

[75] Inventors: Simon John Crook, Exeter; Mark Jury, Thirsk; Malcolm Robert Mackley, Crescent, all of United Kingdom

[73] Assignee: Nestec S.A., Vevey, Switzerland

[21] Appl. No.: 08/898,195

[22] Filed: Jul. 22, 1997

[30] Foreign Application Priority Data

Jul. 23, 1996 [GB] United Kingdom ............ 9615403

[51] Int. Cl.⁶ .................................................. A23G 7/00

[52] U.S. Cl. .............................. 426/516; 426/660

[58] Field of Search ............................ 426/512, 516, 426/660; 425/205, 308, 382.4

[56] References Cited

U.S. PATENT DOCUMENTS 5,439,695  8/1995  Mackey .................................. 426/516

*Primary Examiner*—George Yeung
*Attorney, Agent, or Firm*—Vogt & O'Donnell, LLP

[57] ABSTRACT

Vacuum pressure is applied in a process for extrusion of fat-based confectionery materials, particularly chocolate, chocolate substitute and chocolate analog materials. In the process, a fat-containing confectionery material is fed to, into and through an extruder having a flow constriction and die to obtain an extrudate from the die under conditions of temperature, pressure, contraction ratio and extrusion rate so that the material and the extrudate obtained from the die are in a non-pourable state and so that the material is deformed plastically in the extruder and so that the extrudate is plastically deformable for a period of time, and in the process, the vacuum pressure is applied to the material at a point prior to passing the material through the flow constriction.

13 Claims, 1 Drawing Sheet

EXTRUSION OF FAT-BASED CONFECTIONERY WITH USE OF VACUUM PRESSURE

BACKGROUND OF THE INVENTION

The present invention relates to the extrusion of fat-containing confectionery materials, particularly chocolate and more particularly to a process for the extrusion of solid or semi-solid chocolate.

European Patent Application No. 93114251.7, the entirety of which is hereby incorporated by reference, describes a process for plastically extruding a fat-containing confectionery material which comprises feeding the fat-containing confectionery material into an extruder and applying pressure to the fat-containing confectionery material in a substantially solid or semi-solid nonpourable form upstream of a flow constriction whereby the temperature, pressure, contraction ratio and extrusion rate are such that the fat-containing confectionery material is extruded and remains in a substantially solid or semi-solid nonpourable form to produce an axially homogeneous extruded product having a cross section that is of substantially the same profile as the die exit of the extruder, which is capable of retaining its shape and which has a temporary flexibility or plasticity enabling it to be physically manipulated, cut or plastically deformed before losing its flexibility or plasticity.

In Great Britian Patent Application No. 96 06285, the entirety of which is hereby incorporated by reference, describes a process for the continuous extrusion of chocolate or a fat-containing confectionery material using a screw extruder which comprises feeding the chocolate or fat-containing confectionery material into the screw extruder and generating a pressure to force the chocolate or fat-containing confectionery material in a substantially solid or semi-solid nonpourable form upstream of a flow constriction whereby the temperature of the screw, the temperature of the barrel wall, the screw speed, pressure, contraction ratio and extrusion rate are such that the chocolate or fat-containing confectionery material is extruded in a substantially solid or semi-solid nonpourable form to produce an axially homogeneous extruded product having a cross section that is of substantially the same profile as the die exit of the extruder, which is capable of retaining its shape and which has a temporary flexibility or plasticity enabling it to be physically manipulated, cut or plastically deformed before losing its flexibility or plasticity.

The temporary flexibility of the extruded fat-containing confectionery material obtained in the process of the above-mentioned patent applications may last for up to 4 hours or more, generally from 0.1 second to 2 hours or typically from 10 seconds to 1 hour. During this period of temporary flexibility, the extruded fat-containing confectionery material may be cut cleanly, which is in the extruded material after the temporary flexibility has been lost, and to a normal set chocolate, which has to be heated slightly for cutting, otherwise it would shatter owing to its brittleness. However, the appearance of the cut extruded chocolate is not always as attractive as desired because there may be whitish streaks or blotches on both the exterior surface and on the cut surface. The streaks or blotches give a streaky pattern similar to mouldy cheese.

SUMMARY OF THE INVENTION

Surprisingly, we have found that in the process of the above-mentioned European and British Applications by applying a vacuum to the chocolate feed upstream of the extruder die, the extruded chocolate has an attractive appearance without or substantially without any streaks or blotches on either the exterior surface or on the cut surface. Although not wishing to be bound by any theory, we believe that the product cohesiveness is improved owing to a reduction of the trapped air spaces in the product.

Accordingly, the present invention provides a process for plastically extruding a fat-containing confectionery material which comprises feeding the fat-containing confectionery material into an extruder and applying pressure to the fat-containing confectionery material in a substantially solid or semi-solid nonpourable form upstream of a flow constriction whereby the temperature, pressure, contraction ratio and extrusion rate are such that the fat-containing confectionery material is extruded and remains in a substantially solid or semi-solid nonpourable form to produce an axially homogeneous extruded product having a cross section that is of substantially the same profile as the die exit of the extruder, which is capable of retaining its shape and which has a temporary flexibility or plasticity enabling it to be physically manipulated, cut or plastically deformed before losing its flexibility or plasticity characterised in that a vacuum is applied to the fat-containing confectionery material upstream of the flow constriction.

DETAILED DESCRIPTION OF THE INVENTION

Figure 1:
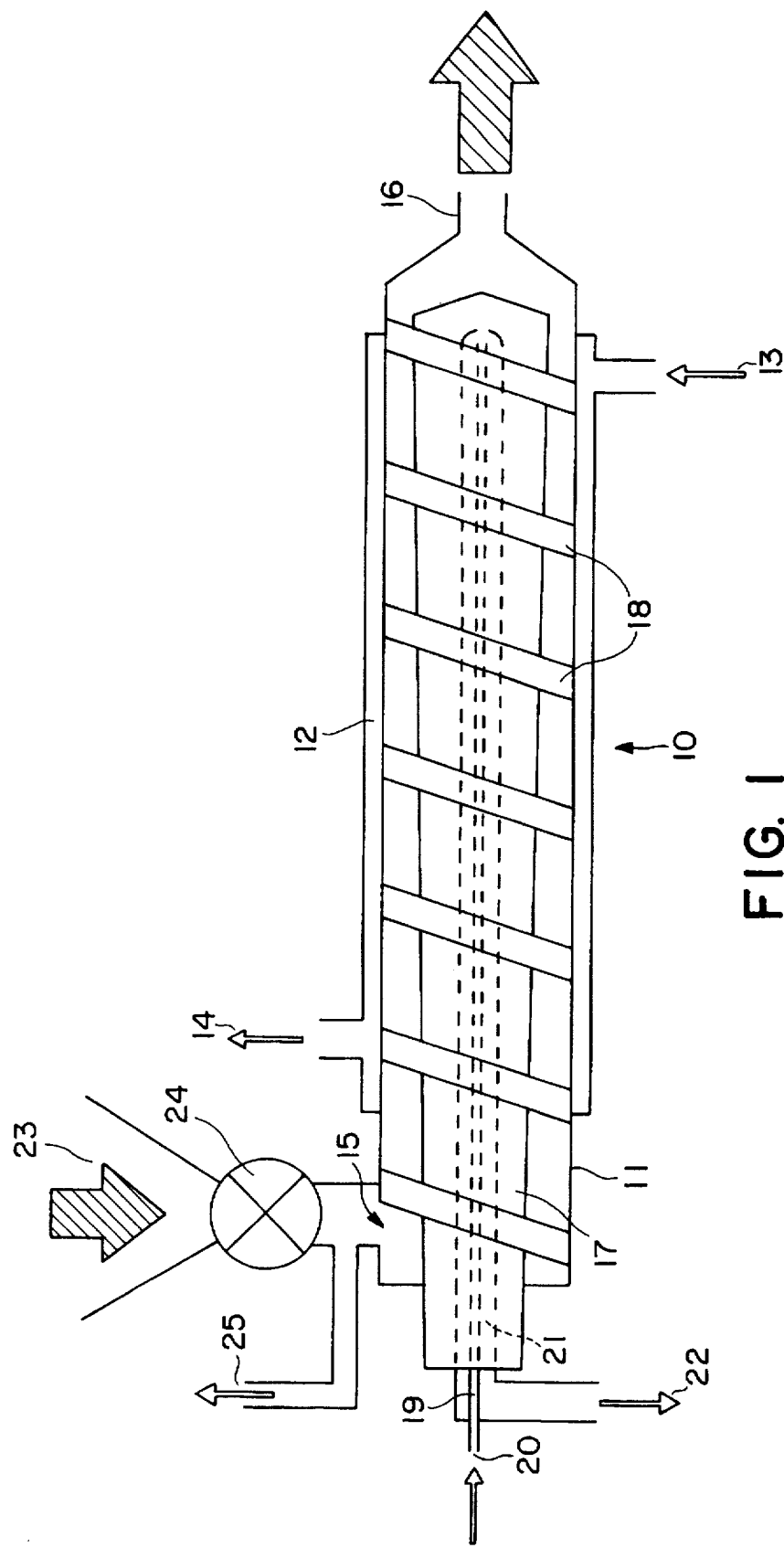

Before being fed into the extruder, the fat-containing confectionery material may be stored in a hopper or other container. The vacuum may be applied to the fat-containing confectionery material at any point between the hopper and the infeed of the extruder or while the fat-containing confectionery material is being fed into the extruder. Optionally, a valve, preferably a rotary valve, may be present between the hopper or other container and the infeed of the extruder. The vacuum pressure may be as low as 1 mbar or less but is more conveniently from 10 to 500 mbar and preferably from 50 to 300 mbar.

The fat-containing confectionery material may be fed into the barrel of the extruder in a solid or semi-solid form, e.g. in a granular or continuous form. When in granular form, the granular nature of the fat-containing confectionery material appears to be lost during extrusion to give an essentially uniform material. The extruded material can be cut cleanly during the post-extrusion period of temporary flexibility or plasticity.

As set forth in the afore-mentioned European Application, the extrusion process described comprises feeding a fat-containing confectionery material into an extruder and applying pressure to the fat-containing confectionery material in a substantially solid or semi-solid non-pourable form upstream of a flow constriction at a temperature at which the fat-containing confectionery material is extruded substantially isothermally and remains in a solid or semi-solid non-pourable form to produce an axially homogeneous extruded product having a cross-section which is of substantially a same profile as the die exit of the extruder.

As set forth in the European Application, "substantially isothermally" means that the temperature of the fat-containing confectionery material remains substantially unchanged under the conditions of the extrusion from the input to the outlet of the flow constriction if there is no external heating or cooling means. The use of external heating or cooling means, however, is not excluded as long as the material being extruded remains in a substantially solid or semi-solid non-pourable state throughout the extrusion from the input to the outlet of the flow constriction. In other words, the temperature of the fat-containing confectionery material is not caused to increase substantially by the extrusion process itself. The physical state of the fat-containing confectionery material is such that its general deformation behavior during extrusion is of a plastic nature rather than that of a viscous fluid. Additionally, an important feature of the extrusion process is that for a given die configuration and material composition, the extrusion rate is weakly dependent upon the extrusion pressure.

The flow constriction may be any narrowing of the cross-sectional area of a conduit but it is usually a die, and extrusion can be generated by a differential pressure across the flow construction. As set forth in the European Application, this may be established, for example, by a ram extruder conveniently operating at a controlled rate or pressure.

As is the case in the process of the present invention, the European Application sets forth that the extruder may be a ram extruder, a single-screw extruder, a twin-screw extruder or a CONFORM machine, which operate to generate and apply pressure to a material to pass the material through the extruder to obtain an extrudate from the extruder, and in the process of the present invention, the process may be continuous when a screw extruder is used, and when a twin-screw extruder is used, it may have either counter-rotating screws or co-rotating screws.

As also set forth in the European Application in the European Application, the extrusion process necessarily includes a form of deformation between the input and outlet of the extrusion system. The convergence or contraction ratio into any extrusion orifice is preferably greater than 1.5, the convergence or contraction ratio being defined as the ratio of the inlet area to the minimum cross-sectional area of the die for a simple cylindrical extrusion geometry.

As further set forth in the European Application, it is important that, during extrusion, the fat-containing confectionery material does not become pourable, and it is set forth that the extrusion temperature and pressure should be maintained below a level where this may happen. As additionally set forth, the extrusion pressure is partially dependent, amongst other things, on the contraction ratio, the extrusion temperature and the confectionery composition and may be from 1 to 1,000 bars, e.g. from 5 to 500 bars and typically from 5 to 250 bars, and it is set forth that an important feature of the extrusion process is that for a given die configuration and material composition, the extrusion rate is weakly dependent upon the extrusion pressure.

Also, it is set forth in the European Application that the sectional geometry of the die may be of a square of profiled form. Typically, it might be a conical entry with an inlet cone angle of from 10° to 90°. The flow rate of the chocolate through the extruder die will depend amongst other things on extrusion pressure, temperature, die configuration and material formulation. Extrusion rates may vary from 0.1 cm/sec to in excess of 1 m/sec, for instance.

Additionally, as set forth in the European Application, a wide variety of die shapes may be used and the extruded fat-containing confectionery material may have a solid profiled or hollow section and essentially has the same shape as the die, e.g. rods, spirals, twists, springs, hollow sections such as tubes and more complex shapes such as the letters of the alphabet as well as thin films having a thickness which may be as little as 100 microns. The dimensions of the die depend on the desired size of the extruded product. A multi-orifice die head could also be used, if desired. Multi-material co-extrusion is also possible with this technique, and the extrusion of the fat-containing confectionery material may be carried out as a co-extrusion with other food materials. Co-extrusion with other food materials such as ice cream, fondant, etc., is especially advantageous when the fat-containing confectionery material is extruded in a hollow or tubular form.

When a screw extruder is used, the conditions of the screw extrusion may be as described in Great Britian Patent Application 96 06285.

As set forth in the British Application, the temperature of the screw may be controlled, for instance, by a fluid such as water at the appropriate temperature flowing through the interior of the screw. For example, the fluid may enter at the upstream end and flow to the downstream end through one or more longitudinal channels and return through one or more longitudinal channels to the upstream end where it exits the temperature of the barrel wall may be controlled, for instance, by a fluid such as water or glycol or a mixture thereof at the appropriate temperature flowing through a jacket surrounding the barrel wall.

The temperatures of the screw and the barrel wall may be controlled according to the type of fats present in the material being extruded. For example, fats having higher melting points usually require a warmer barrel wall and screw than fats having lower melting points. The degree of flexibility of the extruded product may be affected by the temperature and the melting point of the fats present in the material being extruded.

With regard to the screw temperature, if the temperature is too low, the chocolate will adhere to the screw and will not flow, whereas if the temperature is too high, the chocolate melts causing blockages. Depending on the type of fats present in the material being extruded, the temperature of the screw may be from 10° to 35° C., and more usually from 15° to 30° C.

With regard to the barrel wall temperature, if the temperature of the barrel wall is too high, the chocolate melts and slips against the wall and does not flow efficiently. Depending on the type of fats present in the material being extruded, the temperature of the barrel wall may be from −50° to +20° C., more usually from −25° to +15° C. Often, the temperature of the barrel wall conveniently may be lower than the incoming chocolate or fat-containing confectionery material, but in some circumstances, the temperature of the barrel wall may be higher than that of the incoming fat-containing confectionery material or chocolate material.

Conveniently, the temperature of the screw is greater than the temperature of the barrel wall, for instance, by from 5° to 50° C., preferably from 10° to 40° C. and more preferably from 12° to 30° C.

As further set forth in the British Application that, in one advantageous embodiment, the diameter of the screw root increases from the upstream to the downstream end while the pitch remains constant. In another advantageous embodiment, the pitch of the screw decreases from the upstream to the downstream end while the diameter of the screw root remains constant.

The compression ratio of the screw may be from 1:1 to 5:1 and preferably from 1.5:1 to 3:1. Compression ratios above 5:1 may cause blockages of the material being extruded. The ratio of length to diameter of the screw may be, for instance, from 5:1 to 30:1 and preferably from 10:1 to 25:1.

The diameter of the screw may be, for example from 20 to 500 mm. The screw speed may be, for example, from 1 to 500 rpm. The actual screw diameter and screw speed may be selected by the person skilled in the art according to the requirements. The throughput depends on the screw speed and may be, for instance, from 1 to 5,000 kg/hr according to requirements.

Further, in the invention of the British Application, as in the present invention, a twin-screw extruder may be used and may be either one using counter-rotating screws or one using co-rotating screws.

As set forth in the European Application, extrusion temperatures may range from 0° to about 35° C. depending upon the composition processed, and as set forth in the British Application, the temperature of the chocolate or fat-containing confectionery material as it is extruded may be conveniently from 15° to 28° C., more usually from 18° to 25° C., e.g. from 20° to 23° C.

In the process of the present invention, the chocolate or fat-containing confectionery material as it is extruded may be conveniently from 0° to 28° C., more usually from 15° to 25° C., e.g. from 18° to 23° C.

The chocolate material employed in the process of the present invention may be dark, milk or white chocolate. Fat containing confectionery materials may include sugar, milk derived components, and fat and solids from vegetable or cocoa sources in differing proportions having a moisture content less than 10%, more usually less than 5% by weight. They may be chocolate substitutes containing direct cocoa butter replacements, stearines, coconut oil, palm oil, butter or any mixture thereof; nut pastes such as peanut butter and fat; praline; confectioner's coatings used for covering cakes usually comprising chocolate analogues with cocoa butter replaced by a cheaper non-tempering fat; or "CARAMAC" sold by Nestlé comprising non-cocoa butter fats, sugar and milk.

If desired, two or more fat-based confectionery materials may be extruded in accordance with the process of the present invention. In addition, the chocolate or fat-containing confectionery material may be co-extruded with other food materials such as ice cream, sorbet, yoghurt, mousse, fondant, praline, marshmallow, nougat or jelly, etc., such being advantageous when the fat-containing confectionery material is extruded in a hollow or tubular form. Hence, in such embodiments, a multi-orifice die and/or associated equipment, as are known to those skilled in the art, may be employed.

The present invention is further described by way of example only with reference to the accompanying drawing.

BRIEF DESCRIPTION OF THE DRAWING FIGURE

The drawing FIGURE schematically illustrates a continuous extrusion system in accordance with the present invention.

DETAILED DESCRIPTION OF THE DRAWING FIGURE

Referring to the drawing Figure, the extruder generally designated 10 comprises a barrel 11 provided with a cooling jacket 12 having an inlet for cooling fluid 13 and an outlet for cooling fluid 14, an inlet 15 for the feed material to be extruded, a die 16 having a circular cross-section and a diameter of 6.5 mm, and a screw 17 whose root diameter increases from the upstream end to the downstream end and which is provided with threads 18 whose pitch is constant from the upstream end to the downstream end. The screw 17 is provided with a channel 19 for heating fluid, the channel extending from the upstream end to the downstream end and having an inlet 20 connected with a concentric channel 21 leading to an outlet for the heating fluid 22. Positioned above the inlet for the feed material to be extruded 15 is a hopper 23, a rotary valve 24 and a connecting pipe 25 leading to a means for applying a vacuum 25 (not shown).

EXAMPLES

The operation of the above-described single screw extruder is described in the following Examples.

Example 1

Milk chocolate buttons in the hopper 23 having a temperature of 22° C. are fed via the rotary valve 24 into the barrel 11 of the extruder 10 through the feed inlet 15. Positioned between the rotary valve 24 and the feed inlet 15 is a pipe 25 leading to a vacuum pump (not shown) which applies a vacuum pressure of 100 mbar to the chocolate buttons. The screw 17 has a diameter of 32 mm, a length to diameter ratio of 24:1, a 2:1 compression ratio and a screw speed of 65 rpm. A 50:50 mixture of water and glycol at −5° C. flows through the cooling jacket 12 of the barrel and water at 20° C. flows through the channels 19 and 21 of the screw. As the screw rotates, the solid chocolate flows through at a rate of 15 kg/hr and is extruded through the die 16 with a configuration conforming to that of the die and has a temporary flexibility which lasts for about 1 hour. The extruded chocolate is cut 1 minute after extrusion and exhibits no streaks or blotches on its exterior or cut surfaces.

Example 2

Milk chocolate buttons in the hopper 23 having a temperature of 22° C. are fed via the rotary valve 24 into the barrel 11 of the extruder 10 through the feed inlet 15. Positioned between the rotary valve 24 and the feed inlet 15 is a pipe 25 leading to a vacuum pump (not shown) which applies a vacuum pressure of 100 mbar to the chocolate buttons. The screw 17 has a diameter of 90 mm, a length to diameter ratio of 15:1, a 2:1 compression ratio and a screw speed of 35 rpm. Water at 5° C. flows through the cooling jacket 12 of the barrel and water at 20° C. flows through the channels 19 and 21 of the screw. As the screw rotates, the solid chocolate flows through at a rate of 280 kg/hr and is extruded through the die 16 with a configuration conforming to that of the die and has a temporary flexibility which lasts for about 1 hour. The extruded chocolate is cut within 1 second after extrusion and exhibits no streaks or blotches on its exterior or cut surfaces.

We claim:

1. In a process for preparing a confectionery article wherein a fat-containing confectionery material is fed to and into an extruder and the extruder generates and applies pressure to the material to pass the material through the extruder and through an extruder flow constriction and die to obtain an extrudate from the die under conditions of temperature, pressure, contraction ratio and extrusion rate so that the material and the extrudate are in a non-pourable state and so that the material is deformed plastically in the extruder and so that the extrudate is plastically deformable for a period of time, the improvement comprising:

applying a vacuum pressure to the material at a point prior to passing the material through the flow constriction for reduction of air from the material.

2. A process according to claim 1 wherein the vacuum pressure is applied while the material is fed to the extruder.

3. A process according to claim 1 wherein material is fed to the extruder via a hopper to an extruder infeed and wherein the vacuum pressure is applied to the material fed from the hopper to the extruder infeed.

4. A process according to claim 1 the material is fed to the extruder via a valve to an extruder infeed and wherein the vacuum pressure is applied to the material fed from the valve to the extruder infeed.

5. A process according to claim 4 further comprising feeding the material to the valve via a hopper.

6. A process according to claim 4 or 5 wherein the valve is a rotary valve.

7. A process according to claim 1 or 2 or 3 or 4 or 5 wherein the vacuum pressure is from 10 mbar to 500 mbar.

8. A process according to claim 6 wherein the vacuum pressure is from 10 mbar to 500 mbar.

9. A process according to claim 1 wherein the extruder is a single-screw extruder.

10. A process according to claim 1 wherein the extruder is a twin-screw extruder.

11. A process according to claim 1 wherein the material is selected from the group consisting of fat-containing chocolate, of a chocolate substitute comprising a cocoa butter replacement and of a chocolate analog comprising a cocoa butter replacement.

12. A process according to claim 1 further comprising co-extruding the material with a different food material.

13. A process according to claim 12 wherein the different food material is selected from the group consisting of an ice cream, a sorbet, a yoghurt, a mousse, a fondant, a jelly and of praline, marshmallow and nougat.

* * * * *